United States Patent
Kondasani et al.

(10) Patent No.: US 12,434,731 B2
(45) Date of Patent: Oct. 7, 2025

(54) VEHICLE DRIVER OR OCCUPANT HEALTH AND ALERTNESS MONITORING AND ASSISTANCE SYSTEM

(71) Applicant: FCA US LLC, Auburn Hills, MI (US)

(72) Inventors: Sathya D Kondasani, Northville, MI (US); Nicholas Periat, Oxford, MI (US); Akarsh Rayishankar, Clinton Township, MI (US); Trpko S Blazevski, Grand Blanc, MI (US)

(73) Assignee: FCA US LLC, Auburn Hills, MI (US)

( * ) Notice: Subject to any disclaimer, the term of this patent is extended or adjusted under 35 U.S.C. 154(b) by 209 days.

(21) Appl. No.: 18/326,217

(22) Filed: May 31, 2023

(65) Prior Publication Data

US 2024/0400077 A1 Dec. 5, 2024

(51) Int. Cl.
*B60W 50/14* (2020.01)
*A61B 5/00* (2006.01)
(Continued)

(52) U.S. Cl.
CPC ........... *B60W 50/14* (2013.01); *A61B 5/0205* (2013.01); *A61B 5/6893* (2013.01); *B60Q 1/544* (2022.05); *B60W 60/0051* (2020.02); *A61B 5/05* (2013.01); *A61B 5/332* (2021.01); *B60W 2050/143* (2013.01); *B60W 2050/146* (2013.01); *B60W 2420/408* (2024.01); *B60W 2540/221* (2020.02); *G08B 25/10* (2013.01)

(58) Field of Classification Search
None
See application file for complete search history.

(56) References Cited

U.S. PATENT DOCUMENTS

| 11,922,787 B1* | 3/2024 | Barcia | G06V 10/70 |
| 2012/0164968 A1* | 6/2012 | Velusamy | H04W 4/027 |
| | | | 455/404.2 |

(Continued)

FOREIGN PATENT DOCUMENTS

| CN | 110654393 A | * | 1/2020 | ............. A61B 5/318 |
| CN | 113017580 A | * | 6/2021 | |
| JP | 2022094708 A | * | 6/2022 | |

OTHER PUBLICATIONS

Machine translation of JP-2022094708-A (Year: 2022).*
Machine translation of CN-110654393-A (Year: 2020).*
Machine translation of CN-113017580-A (Year: 2021).*

*Primary Examiner* — Anne Marie Antonucci
*Assistant Examiner* — Kyle S Park
(74) *Attorney, Agent, or Firm* — Jeremy J. Klobucar

(57) ABSTRACT

A driver or occupant health and alert monitoring and assistance system and associated techniques or methods include, among other features, monitoring vital signs of the driver and when these vital signs are determined to be outside of a predetermined range or pattern, alerting the driver via an infotainment system of a potential abnormal health condition and requesting a response from the driver regarding the same. Should the driver not respond within a predetermined period of time, the techniques further provide for taking emergency corrective action including autonomously slowing down the vehicle to a stop, alerting the emergency 911 system of the driver's situation, and/or alerting predetermined emergency contacts of the driver's potential abnormal health condition and vehicle state.

10 Claims, 4 Drawing Sheets

(51) Int. Cl.

| | |
|---|---|
| *A61B 5/0205* | (2006.01) |
| *B60Q 1/50* | (2006.01) |
| *B60W 60/00* | (2020.01) |
| *A61B 5/05* | (2021.01) |
| *A61B 5/332* | (2021.01) |
| *G08B 25/10* | (2006.01) |

(56) References Cited

U.S. PATENT DOCUMENTS

| | | | |
|---|---|---|---|
| 2013/0070043 A1* | 3/2013 | Geva | A61B 5/18 |
| | | | 348/14.02 |
| 2013/0231582 A1* | 9/2013 | Prasad | A61B 5/746 |
| | | | 600/300 |
| 2017/0105104 A1* | 4/2017 | Ulmansky | H04W 4/42 |
| 2017/0274906 A1* | 9/2017 | Hassan | B60K 28/14 |
| 2017/0341658 A1* | 11/2017 | Fung | G06V 40/45 |
| 2019/0099118 A1* | 4/2019 | Patel | A61B 5/746 |
| 2020/0155054 A1* | 5/2020 | Slater | A61B 5/08 |
| 2022/0337696 A1* | 10/2022 | Abutabl | H04M 1/72457 |
| 2022/0363253 A1* | 11/2022 | Keshipeddy | A61B 5/117 |
| 2022/0378302 A1* | 12/2022 | Marcolino Quintao Severgnini | A61B 5/0006 |
| 2023/0386227 A1* | 11/2023 | Lee | G06V 20/59 |
| 2024/0246536 A1* | 7/2024 | Gao | B60W 40/08 |

\* cited by examiner

VEHICLE DRIVER OR OCCUPANT HEALTH AND ALERTNESS MONITORING AND ASSISTANCE SYSTEM

FIELD

The present application generally relates to a vehicle driver monitoring system and, more particularly, to a vehicle driver health and alertness monitoring and assistance system.

BACKGROUND

Some of today's vehicles include driver monitoring systems designed to detect an inattentive or distracted driver. An interior, driver facing camera is typically utilized for this purpose. Such known systems, however, are not capable of monitoring for and detecting a health condition of the driver. Further, such known systems do not provide alerts nor do they take corrective action based on a detected driver health condition. Therefore, while such known driver monitoring systems do work well for their intended purpose, there remains a desire for improvement in the relevant art.

SUMMARY

According to one example aspect of the invention, a driver or occupant health monitoring and assistance system for a vehicle is provided. In one exemplary implementation, the driver or occupant health monitoring and assistance system includes: an electronic control unit having a communication device, memory and one or more processors; a health monitoring sensor in signal communication with the control unit, where the sensor is coupled to a component associated with a driver seat of the vehicle and adapted to monitor one or more vital signs of a driver; an infotainment system in signal communication with the control unit; an advanced driver assistance system (ADAS) in signal communication with the control unit and configured to autonomously drive the vehicle; wherein the control unit is configured to, via the one or more processors: receive signals from the health monitoring sensor indicative of the one or more vital signs; determine, based on the received signals, whether one or more of the one or more vital signs fall outside of a predetermined range or pattern thereby indicating an abnormal health condition of the driver; when the one or more vital signs are determined to be outside the predetermined range or pattern, commanding the infotainment system to provide an alert adapted to be observable by the driver and requesting a response from the driver; monitoring the infotainment system for the response from the driver within a predetermined period of time; and when the response is not received within the predetermined period of time and/or the response is indicative of confirmation of the abnormal health condition: when the vehicle is moving, commanding the ADAS to take emergency action to autonomously stop the vehicle; and commanding the ADAS to i) cooperate with the infotainment system to contact emergency 911; ii) provide emergency 911 with a global positioning system location of the vehicle; and iii) text a predetermined emergency contact with a predetermined emergency message.

In some implementations, the health monitoring sensor is coupled to a seatbelt of the driver or occupant seat of the vehicle so as to be adapted to be proximate a heart of the driver. In some implementations, the health monitoring sensor is positioned in a seatback of the driver seat of the vehicle so as to be adapted to be proximate the heart of the driver.

In some implementations, the health monitoring sensor comprises a mmWave Radar sensor. In some implementations, the health monitoring sensor comprises two health monitoring sensors including the mmWave Radar sensor and an EKG sensor. In some implementations, one of the mmWave Radar sensor and the EKG sensor is coupled to a seatbelt of the driver seat of the vehicle so as to be adapted to be proximate a heart of the driver, and the other of the mmWave Radar sensor and the EKG sensor is positioned in a seatback of the driver seat of the vehicle so as to be adapted to be proximate the heart of the driver.

In some implementations, the vital signs monitored by the mmWave Radar sensor include a heart rate and a breath rate. In some implementations, the vital signs monitored by the mmWave Radar sensor include a heart rate pattern, and wherein determining whether one or more of the one or more vital signs of the driver or occupant fall outside of a predetermined range or pattern includes comparing the monitored heart rate pattern to a known heart rate pattern indicative of a body condition of hunger or low glucose levels.

In some implementations, commanding the infotainment system to provide an alert adapted to be observable by the driver or occupant in the vehicle and requesting a response from the driver or occupant includes the infotainment system displaying a pop-up message that includes requesting a response from the driver via a human machine interface (HMI) of a display of the infotainment system. In some implementations, when the response is not received within the predetermined period of time, the system includes further alerting the driver by commanding the infotainment system to read aloud the pop-up message via a speaker in communication with the infotainment system and requesting the driver to respond via the HMI.

In some implementations, commanding the ADAS further comprises turning on hazard lights of the vehicle and lowering at least one window of the vehicle after the vehicle has been brought to the stop and before commanding feature iii). In some implementations, commanding the ADAS to perform feature iii) includes commanding the ADAS to perform feature iii) after commanding the ADAS to perform features i) and ii).

In some implementations, commanding the ADAS to text a predetermined emergency contact with a predetermined emergency message includes first determining if the predetermined emergency contact number is connected to the infotainment system and, if so, commanding the ADAS to text another predetermined emergency contact determined to not be connected to the infotainment system with the predetermined emergency message.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

As previously discussed, current driver monitoring systems have limitations and/or drawbacks that present opportunities for improvement in the relevant art. For example, typical driver monitoring systems and camera based and are not equipped to monitor and process vital signs of a vehicle driver and are typically limited in their capability to communicate with the driver and in their ability to take emergency corrective action with the vehicle and its associated systems.

As a result, an improved driver or occupant health and alertness monitoring system and assistance system and methodology has been developed by the inventors and is presented herein. The system and method (alternatively also referred to as techniques) provide for, inter alia, monitoring vital signs of the driver or occupant and when these vital signs are determined to be outside of a predetermined range or pattern, alerting the driver of a potential abnormal health condition and requesting a response from the driver regarding the same. Should the driver or occupant not respond in a predetermined period of time, the techniques further provide for taking emergency corrective action including autonomously slowing down the vehicle to a stop, alerting the emergency 911 system of the driver's situation, and/or alerting predetermined emergency contacts of the driver's situation. Further features and discussion of the driver or occupant health and alertness monitoring system and assistance system will continue below with reference to the drawings. It should be understood that while the discussion will continue with reference to the driver health and alertness monitoring system and assistance system, the health and alertness monitoring system and assistance system can be utilized with any occupant of the vehicle including more than one occupant of the vehicle.

Figure 1:
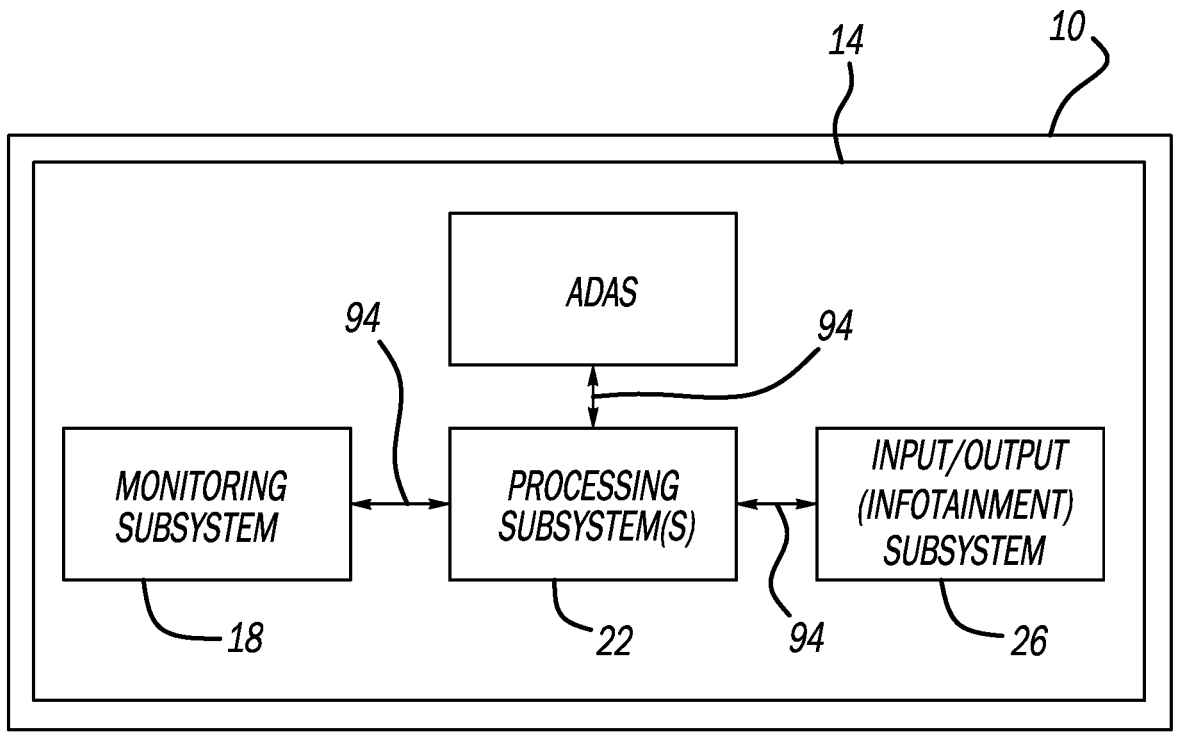
FIG. 1 is a high level schematic illustration of hardware and/or architecture of the driver or occupant health monitoring and assistance system according to the principles of the present application.

Turning now to the drawings, and with initial reference to FIG. 1, a vehicle 10 is schematically shown and includes a driver health and alertness monitoring and assistance system (hereinafter also referred to as the "system") 14. FIG. 1 illustrates a high level block diagram schematic of the vehicle and the hardware or physical structure of the system 14. In one example implementation, the system structure or architecture at a high level includes, inter alia, a monitoring system or subsystem 18, a processing system or subsystem 22, an input/output or infotainment system or subsystem 26 and an assistance system or subsystem 30 shown in the form of an advanced driver assistance system (ADAS). Each of these systems or subsystems communicate and cooperate with each other in performing the driver health and alertness monitoring and assistance, as discussed in greater detail below.

With continuing reference to FIG. 1 and additional reference to FIGS. 2-5, each subsystem (18, 22, 26, 30) will now be discussed in greater detail. The monitoring subsystem 18 includes at least one sensor 34 configured to measure certain vital signs of the driver. In one example implementation, one sensor 34 is utilized to measure the heart rate and breath rate of the driver. In this example implementation, the sensor 18 can be a millimeter wave radar sensor (commonly known as a mmWave Radar sensor) for monitoring of human being vital signs. In this example, the mmWave Radar sensor 34 can measure the heartbeat per minute and the breath rate per minute of the driver and communicate the same to the processing subsystem 22. The mmWave Radar sensor 34 can utilize a frequency in the range of 50 ghz to 70 ghz and can measure the heart rate and breath rate using Doppler technology, for example.

Figure 2:
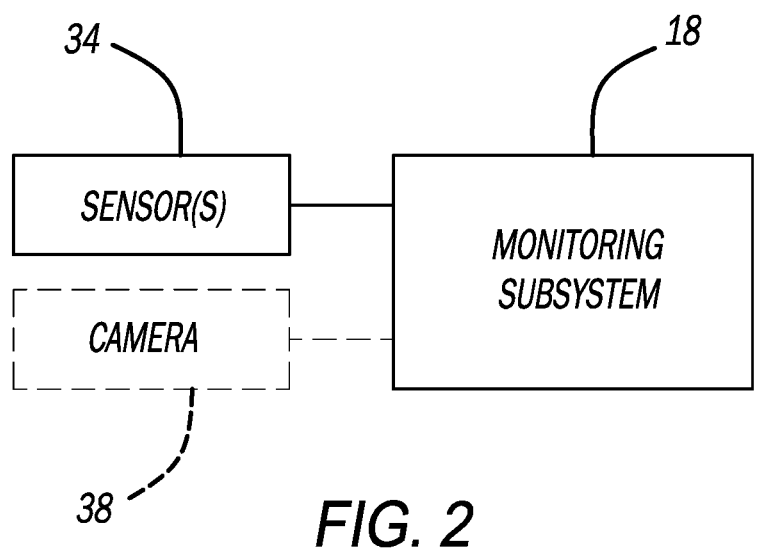
FIG. 2 is a high level schematic illustration of a monitoring system and certain of its associated components or systems according to the principles of the present application.

Optionally, an EKG sensor 34 can also be utilized to augment the mmWave Radar sensor for both comparison and redundancy purposes. Similar to the mmWave Radar sensor, this sensor can also communicate heartbeat information to the processing subsystem 22. For both sensors 34, the communication can be wired or wireless, such as via Bluetooth or other wireless communication protocols known in the art. Further optional is a camera 38, such as an RGB camera, which can be utilized to augment the driver monitoring performed by the one or more sensors 34. Optional camera 38 is schematically shown in FIG. 2 in dashed lines to further clarify in the drawings the optional nature of this component.

Figure 3:
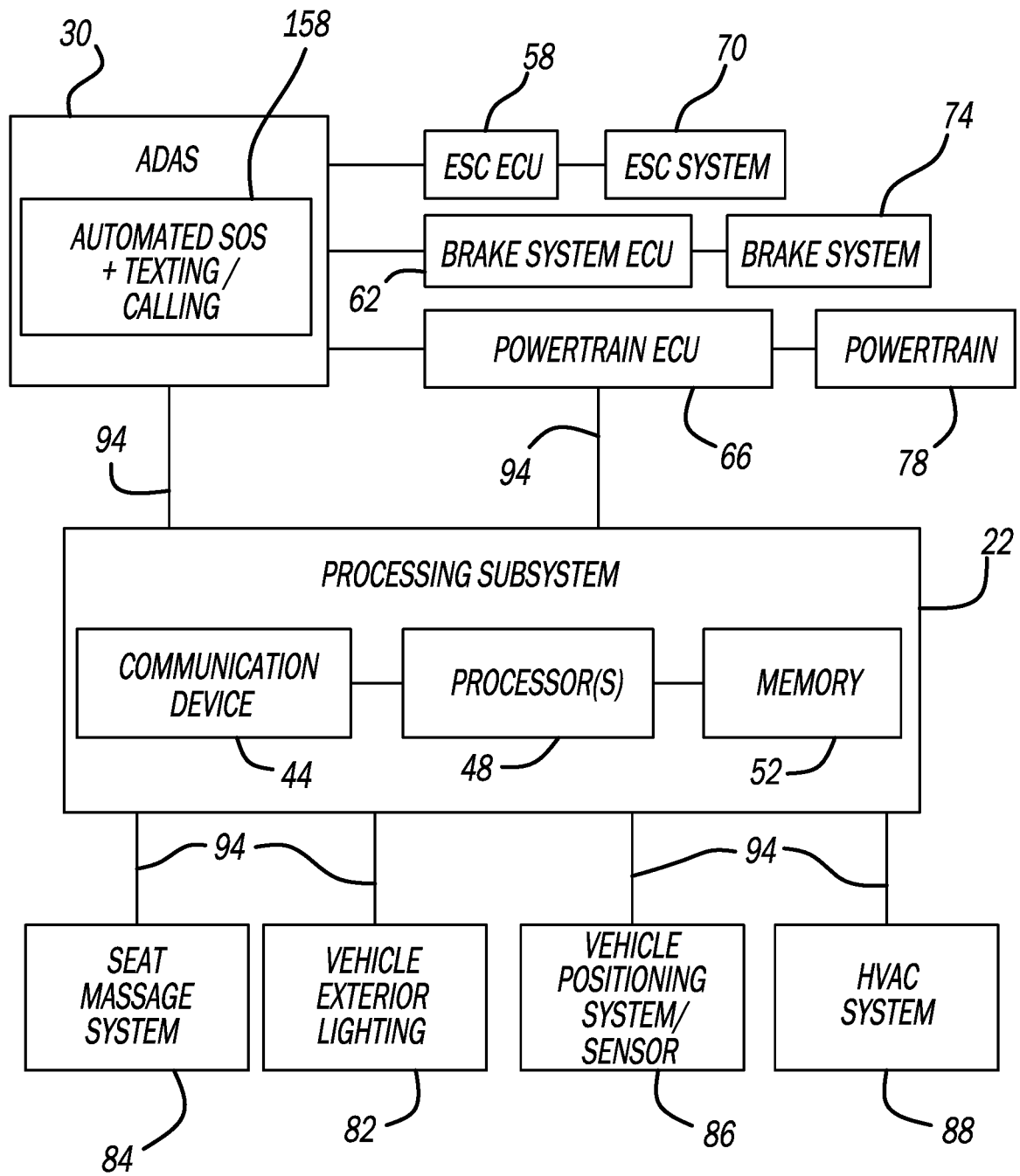
FIG. 3 is a high level schematic illustration of a processing system and an ADAS and certain of its associated components or systems according to the principles of the present application.

Turning now to FIG. 3 and with continuing reference to FIGS. 1-2, the processing system 22 and assistance system (ADAS) 30 will now be discussed. The processing system 22 includes one or more processing systems that can take the form of an electronic control unit (ECU), a controller, a control system and/or an application specific integrated circuit (ASIC), as is known in the art. The one or more processing systems 22 include a communication device 44, one or more processors 48, and memory 52, as is also known in the art. The one or more processors can be incorporated into a single device, such as the infotainment unit, or can be distributed across multiple devices in various ECUs associated with such devices. For example only, the system 14 could include a master processing system 22 that communicates with processing subsystems 22 in each of the ADAS 30 and infotainment subsystem 26. Alternatively, the infotainment subsystem 26 can include a processing subsystem 22 that serves as the master processing subsystem for the system 14 and communicates with various ECUs of other systems such as ADAS 30, etc. For simplicity only, the discussion of system 14 will continue with reference to the example implementation of the master or main processing subsystem 22 for the system 14 being associated with the infotainment subsystem 26. As shown in FIGS. 1-3, the processing subsystem 22 receives signal data from the one or more sensors of the monitoring subsystem 18.

In the example implementation illustrated, the processing subsystem 22 is also in signal communication with the ADAS 30. The ADAS 30 is in signal communication with an optional electronic stability control system (ESC) ECU 58, a braking system ECU 62 and a powertrain ECU 66, which are in respective communication with an ESC system 70, a braking system 74 and a powertrain 78. The processing subsystem 22 is also in signal communication with vehicle exterior lighting 82, a vehicle seat massage system 84, a vehicle global positioning system 86 and a vehicle heating, ventilation and air-conditioning (HVAC) system 88, such as via separate or common ECUs, such as a body controller or ECU. Each of the ECUs and/or processing subsystems 22 discussed herein can communicate with each other over a vehicle local controller area network, such as a vehicle CAN bus 94.

Figure 4:
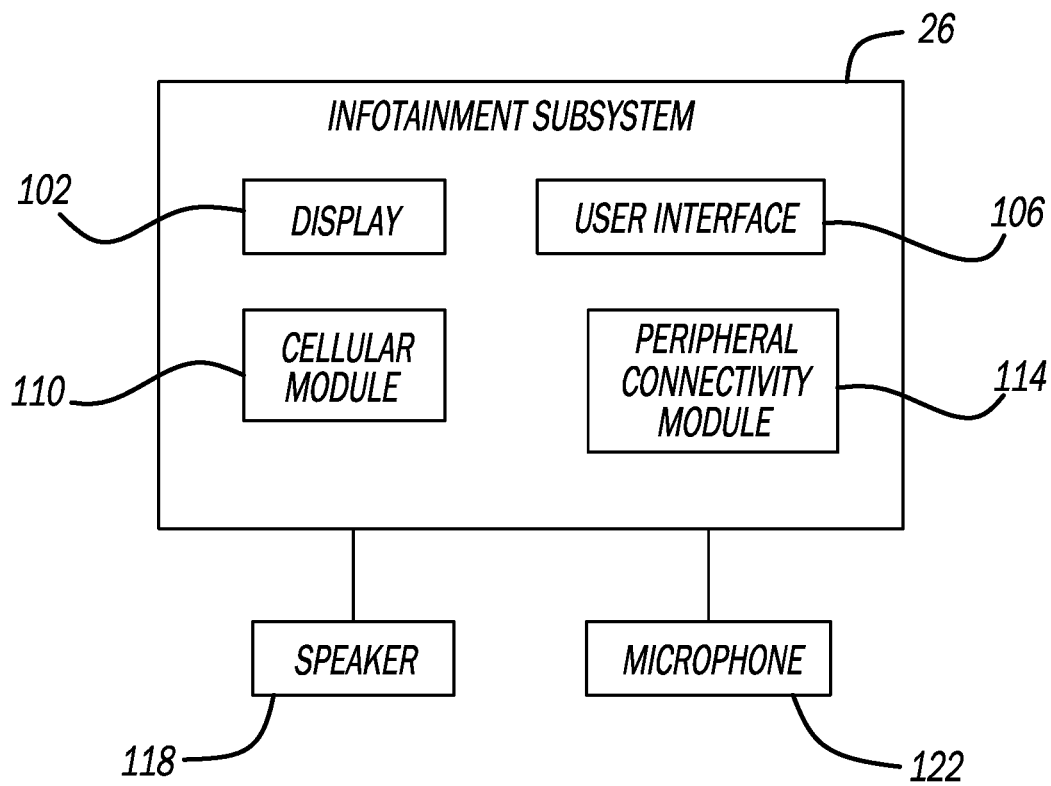
FIG. 4 is a high level schematic illustration of an infotainment system and certain of its associated components or systems according to the principles of the present application.

Turning now to FIG. 4, and with continuing reference to FIGS. 1-3, the input/output or infotainment subsystem 26 will now be discussed. The infotainment subsystem 26 incorporates or is in signal communication with a processing subsystem 22 and includes a display 102, a user interface 106, a cellular module 110 for optional cellular connectivity independent of a vehicle occupant's mobile phone, and a peripheral connectivity module 114 for wireless communication with one or more vehicle occupant's mobile devices. The infotainment subsystem 26 is also in communication with a microphone 118 and a speaker 122, both positioned in an interior of vehicle 10. Such infotainment systems 26 and their basic general capabilities associated with the above-discussed components are known in the art. One example of such infotainment subsystem 26 is the Applicant's Uconnect® system available in certain of its production vehicles.

Figure 5:
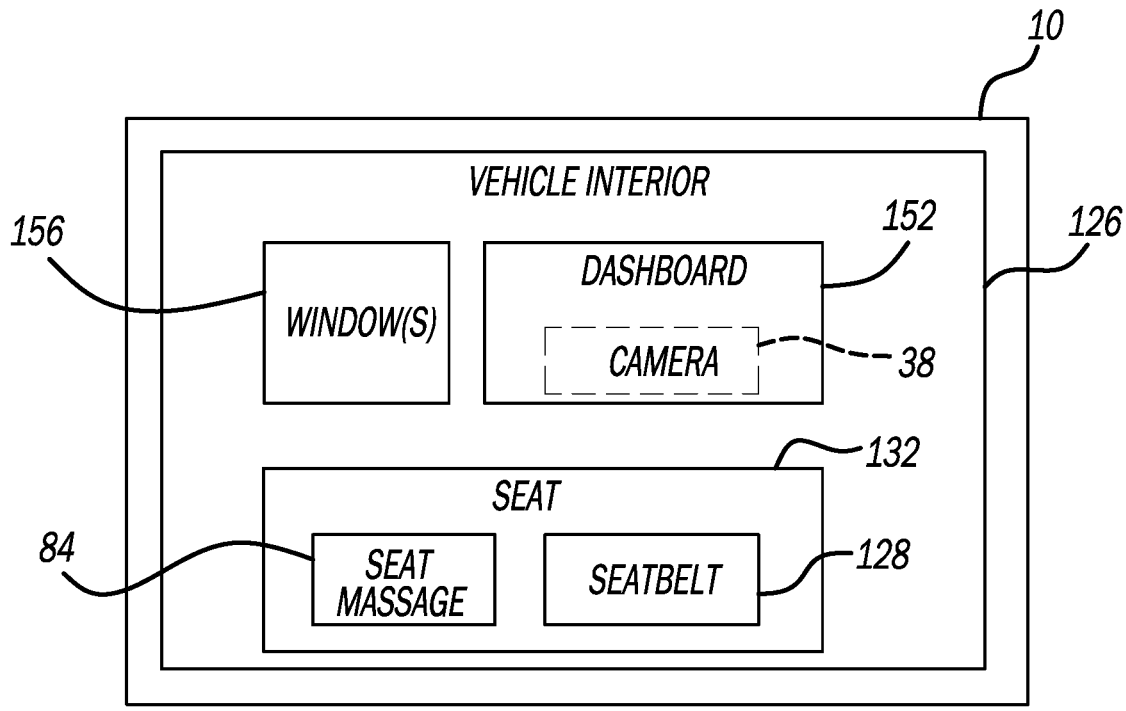
FIG. 5 is a high level schematic illustration of a vehicle and certain of its associated components or systems according to the principles of the present application.
Figure 6:
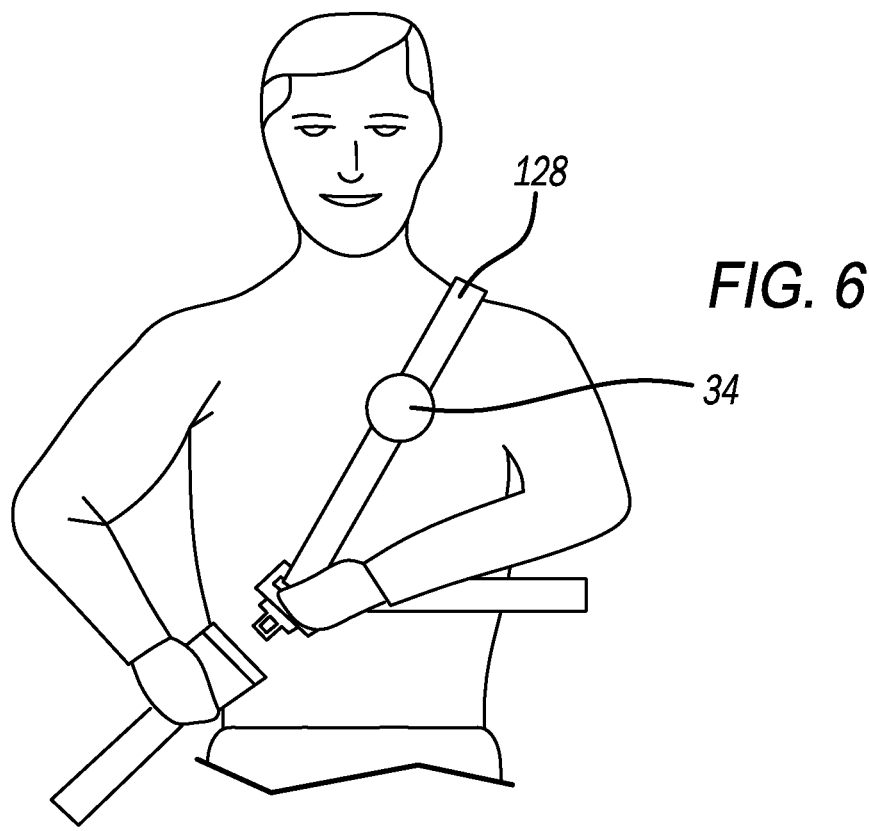
FIG. 6 is schematic illustration of an example placement of a vital sign monitoring sensor according to the principles of the present application.
Figure 7:
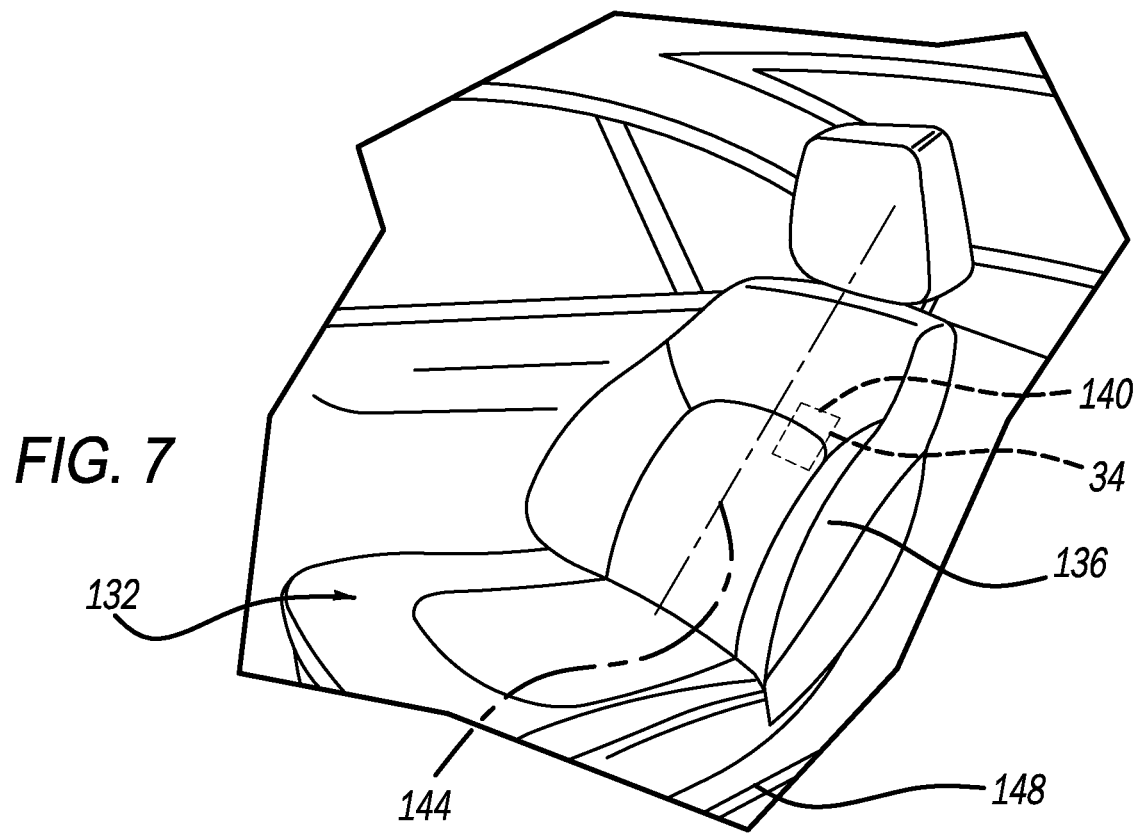
FIG. 7 is schematic illustration of an example placement of a vital sign monitoring sensor according to the principles of the present application.

Referring now to FIGS. 5-7 and with continuing reference to FIGS. 1-4, placement of the one or more sensors 34 in an interior 126 of vehicle 10 will now be discussed. The inventors discovered that placement of such sensor(s) 34 in close proximity to the driver's heart enhances signal accuracy for the system 14. As a result, the sensor(s) 34 can be placed on a seatbelt 128 of a driver seat 132 of vehicle 10, as shown in FIGS. 5 and 6. The one or more sensors 34 can alternatively be placed at a location 140 in a seatback 136 of seat 132 in proximity of a driver's heart when seating in seat 132. In one example implementation, the location 140 would be offset from a longitudinal centerline 144 of the seatback 136 in a direction toward a driver door area or opening 148. In another example implementation where both the mmWave Radar sensor 34 and the EKG sensor 34 are utilized, one of such sensors can be position on the seatbelt 128 as shown in FIG. 6 and the other can be placed in the seatback 136 at location 140, as shown in FIG. 7. To the extent the optional camera 38 would be utilized, an example placement in the interior of vehicle 10 would be on or in a dashboard 152.

Example operation and/or use of the driver health and alertness monitoring and assistance system 14 will now be discussed with reference to the aforementioned systems/subsystems and components. In this example operation, the mmWave Radar sensor 34 with or without the optional EKG sensor 34 can continuously monitor the heart rate and breath rate of the driver and report the same to the processing subsystem 22. Using signal processing software, processing subsystem 22 can analyze the monitored heart and breath rates in terms of variability and as compared to predetermined heart and breath rates. If variability beyond a predetermined threshold is detected, the processing subsystem 22 commands the infotainment system 26 to alert the driver such as via one or more of the display 102 and the speaker 118.

If the detected variability continues for or beyond a predetermined period of time, the processing subsystem 22 commands the infotainment subsystem 26 to display a pop-up message in the display 102 inquiring if the driver is okay and requesting a response. The response can be entered by the driver using the user interface (HMI) 106, such as by pressing a "Yes" or "No" HMI icon or by simply canceling/closing the pop-up message. If the driver cancels the pop-up message or selects "no", then system 14 resumes its normal operation of motoring the driver's vital signs. In connection with displaying the pop-up message, the processing subsystem 22 may also command the HVAC system 88 to blow conditioned cooled air to the driver and/or command the seat massage system 84 to an on state for the driver's seat. In addition to variability, the system 14 can also optionally analyze the monitored heart and breath rates relative to driver specific ranges stored in memory 52 of processing subsystem 22.

Should the driver not respond within a predetermined period of time for a response, the processing subsystem 22 commands the infotainment subsystem to read the notification aloud via the speaker 118. If the driver does not respond within another predetermine period of time, then system 14 via processing subsystem 22 will command assistance and/or emergency corrective action via at least ADAS 30, vehicle exterior lighting 82 and the vehicle positioning system or sensor 86.

In one example implementation, this assistance and/or emergency corrective action can include commanding the ADAS 30 to initiate an automated minimum risk maneuver, which can include commanding the vehicle's hazard lights 84 to switch to on, slowing the vehicle down to a stop via at least commands to the brake system ECU 62 and powertrain system ECU 66, and lowering windows 156 of the vehicle 10. The assistance and/or emergency corrective action can also include commanding the ADAS 30 to initiate automated SOS or ASOS 158 calling or communication to emergency 911 indicating the driver is incapacitated and needs attention, and providing global positioning system (GPS) coordinates via GPS system/sensor 88.

In addition to the above, the system 14 via processing subsystem 22 commands the infotainment subsystem 26 to contact a predetermined number of stored emergency contacts informing them of the driver's condition. In one example implementation, the infotainment subsystem 26 sends an automated text to the emergency contacts. In one example implementation, the infotainment subsystem 26 compares the contact numbers for the stored emergency contacts with any contact numbers of occupants other than the driver whose mobile devices are connected to infotainment subsystem 26. With this comparison, infotainment subsystem 26 will seek to send the automated text to at least one stored emergency contact number that does not have its mobile device connected to infotainment subsystem 26.

The driver health and alertness monitoring and assistance system 14 can also continuously monitor a heart rate pattern via the one or more sensors 34 of the driver and compare this monitored pattern to stored heart rate patterns known for indicating hunger and/or has low glucose levels. Should the monitored heart rate patterns be comparable to such stored patterns, processing subsystem 22 can command infotainment subsystem 26 to inform the driver of this condition using stored messages or pop-up communications for use with display 102.

In situations where low blood glucose levels and/or other indications of health conditions that may affect alertness, the processing subsystem 22 can also command the HVAC system 88 to blow conditioned cooled air to the driver and/or command the seat massage system 84 to an on state for the driver's seat.

It will be appreciated that the term "controller" or "module" or electronic control unit or processing system as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A driver health monitoring and assistance system for a vehicle, the driver health monitoring and assistance system comprising:
    an electronic control unit having a communication device, memory and one or more processors;
    a health monitoring sensor in signal communication with the electronic control unit, the health monitoring sensor coupled to a component associated with a driver seat of the vehicle and adapted to monitor one or more vital signs of a driver;
    an infotainment system in signal communication with the electronic control unit;
    an advanced driver assistance system (ADAS) in signal communication with the electronic control unit and configured to autonomously drive the vehicle;
    wherein the electronic control unit is configured to, via the one or more processors:
        receive signal data from the health monitoring sensor indicative of the one or more vital signs;
        determine, based on the received signal data, whether one or more of the one or more vital signs fall outside of a predetermined range or pattern thereby indicating an abnormal health condition of the driver;
        when the one or more vital signs are determined to be outside the predetermined range or pattern, commanding the infotainment system to provide an alert message adapted to be observable by the driver on a display of the infotainment system and that requests a response from the driver via a human machine interface (HMI) of the display of the infotainment system;
        monitoring the infotainment system for the response from the driver within a first predetermined period of time;
        when the response is not received within the first predetermined period of time, further alerting the driver by commanding the infotainment system to read aloud the displayed alert message via a speaker in communication with the infotainment system and requesting the driver to respond via the HMI of the display of the infotainment system within a second predetermined period of time;
        when the response is not received to the further alert within the second predetermined period of time and/or the response to the further alert is indicative of confirmation of the abnormal health condition:
            when the vehicle is moving, commanding the ADAS to take emergency action to autonomously stop the vehicle; and
            commanding the ADAS to i) cooperate with the infotainment system to contact emergency 911; ii) provide the emergency 911 with a global positioning system location of the vehicle; and iii) text a predetermined emergency contact stored in the electronic control unit of the vehicle with a predetermined emergency message, wherein commanding the ADAS to text the predetermined emergency contact stored in the electronic control unit of the vehicle with the predetermined emergency message includes first determining if the predetermined emergency contact number is connected to the infotainment system and, if so, commanding the ADAS to text another predetermined emergency contact stored in the electronic control unit of the vehicle that is determined to not be connected to the infotainment system with the predetermined emergency message.

2. The driver health monitoring and assistance system of claim 1, wherein the health monitoring sensor is coupled to a seatbelt of the driver seat of the vehicle so as to be adapted to be proximate a heart of the driver.

3. The driver health monitoring and assistance system of claim 1, wherein the health monitoring sensor is positioned in a seatback of the driver seat of the vehicle so as to be adapted to be proximate a heart of the driver.

4. The driver health monitoring and assistance system of claim 1, wherein the health monitoring sensor comprises a mmWave Radar sensor.

5. The driver health monitoring and assistance system of claim 4, wherein the health monitoring sensor comprises two health monitoring sensors including the mmWave Radar sensor and an EKG sensor.

6. The driver health monitoring and assistance system of claim 5, wherein one of the mmWave Radar sensor and the EKG sensor is coupled to a seatbelt of the driver seat of the vehicle so as to be adapted to be proximate a heart of the driver, and the other of the mmWave Radar sensor and the EKG sensor is positioned in a seatback of the driver seat of the vehicle so as to be adapted to be proximate the heart of the driver.

7. The driver health monitoring and assistance system of claim 4, wherein the one or more vital signs monitored by the mmWave Radar sensor include a heart rate and a breath rate.

8. The driver health monitoring and assistance system of claim 4, wherein the vital signs monitored by the mmWave Radar sensor include a heart rate pattern, and wherein determining whether one or more of the one or more vital signs of the driver fall outside of the predetermined range or pattern includes comparing the heart rate pattern to a known heart rate pattern indicative of a body condition of hunger or low glucose levels.

9. The driver health monitoring and assistance system of claim 1, wherein commanding the ADAS further comprises turning on hazard lights of the vehicle and lowering at least one window of the vehicle after the vehicle has been brought to the stop and before commanding feature iii).

10. The driver health monitoring and assistance system of claim 1, wherein commanding the ADAS to perform feature iii) includes commanding the ADAS to perform feature iii) after commanding the ADAS to perform features i) and ii).

* * * * *